United States Patent [19]

Bauer et al.

[11] Patent Number: 5,393,088
[45] Date of Patent: Feb. 28, 1995

[54] INVISIBLE SEAM DEPLOYMENT DOOR INSTALLATION WITH STABILIZED AIR BAG DEPLOYMENT OPENING CONSTRUCTION

[76] Inventors: David J. Bauer, 7356 Meadowridge Cir., West Bloomfield, Mich. 48322; Kenneth J. Barnes, 50098 Quinton Ct., Site 198A, Shelby Township, Macomb County, Mich. 48315; Anthony J. DiSalvo, 10821 Reack, Allen Park, Mich. 48101

[21] Appl. No.: 132,150

[22] Filed: Oct. 5, 1993

[51] Int. Cl.⁶ .................................. B60R 21/16
[52] U.S. Cl. ............................ 280/728 A; 280/732
[58] Field of Search .......... 280/728 R, 728 A, 728 B, 280/732

[56] References Cited

U.S. PATENT DOCUMENTS

| | | |
|---|---|---|
| 4,893,833 | 1/1990 | DiSalvo et al. ............... 280/732 |
| 4,989,896 | 2/1991 | DiSalvo et al. ............... 280/732 |
| 5,035,444 | 7/1991 | Carter ........................... 280/728 B |
| 5,080,393 | 1/1992 | Dixon, Jr. et al. ........... 280/732 |
| 5,082,310 | 1/1992 | Bauer ........................... 280/732 |
| 5,217,244 | 6/1993 | Bauer ........................... 280/732 |
| 5,275,432 | 1/1994 | Pray et al. .................... 280/728 A |
| 5,280,947 | 1/1994 | Cooper ......................... 280/728 B |

*Primary Examiner*—Margaret A. Focarino
*Assistant Examiner*—Paul N. Dickson
*Attorney, Agent, or Firm*—John R. Benefiel

[57] ABSTRACT

An installation and method is disclosed for mounting an air bag system in an opening in an instrument panel. A stabilizer frame is fixed around the opening in an instrument panel substrate and anchored to a fixed substructure, restraining bulging movement of the instrument panel to rapidly develop shearing stresses in the covering layer by the pressure exerted by the deployment door substrate panel as it is pushed open by the inflating air bag.

6 Claims, 1 Drawing Sheet

U.S. Patent  Feb. 28, 1995  5,393,088

INVISIBLE SEAM DEPLOYMENT DOOR INSTALLATION WITH STABILIZED AIR BAG DEPLOYMENT OPENING CONSTRUCTION

BACKGROUND OF THE INVENTION

This invention concerns air bag safety systems for passenger vehicles and more particularly the formation of a deployment opening which allows the air bag to be inflated and to enter the passenger compartment of the vehicle.

In many designs, a deployment opening is formed by a hinged door or doors fit into an opening formed in the trim structure behind which the air bag is installed. Upon initiation of the air bag system, the air bag is rapidly inflated forcing the deployment door to hinge open and allow the air bag to deploy into the passenger compartment.

An example of this is shown in U.S. Pat. No. 4,893,833 issued on Jan. 16, 1990, for a "Closure for an Air Bag Deployment Opening". In that design, frangible shearing tabs are relied on to secure the deployment door against opening which frangible tabs is sheared off upon the inflation of the air bag exerting pressure on the inside of the deployment door.

For another example see also U.S. Pat. No. 4,989,896 issued on Jan. 5, 1991, for a "Double Door Closure for an Air Bag Deployment Opening".

In such designs the deployment an door is readily visible to the vehicle occupants. For improved styling and to not invite tampering, there has been developed invisible seam deployment door installation in which the deployment door and the outline of the opening to be formed are not visible but rather the area whereat the deployment door will be formed when the air bag system is operated is overlain by a smooth covering as of a vinyl covering layer.

In this instance, it is necessary to cut through the covering layer upon initiation of the air bag system operation.

A decorative covering layer of vinyl is relatively tough and difficult to sever. It is also critical to proper operation that the air bag deployment occur within a very brief time span, on the order of several milliseconds.

Significant delay in the deployment of the air bag can defeat or seriously impair the effectiveness of the air bag system.

In U.S. Pat. No. 5,217,244 issued on Jun. 8, 1993, for an "Arrangement for Forming and Air Bag Deployment Opening", and U.S. Pat. No. 5,080,393 issued on Jan. 14, 1992, for a "Method and Apparatus for Forming an Air Bag Deployment Opening" there is described the use of linear energy generating elements to completely or partially degrade the vinyl in a pattern overlying the deployment door or doors such as to ensure instantaneous severing of the covering layer.

U.S. Pat. No. 5,082,310 issued on Jan. 21, 1992, for an "Arrangement for Providing and Air Bag Deployment Opening" describes an arrangement for preweakening of the covering layer and exerting an increased pressure by the deployment doors such as to ensure severing of the covering layer.

For both the single and double door installations, the severing of the covering layer depends in large measure on the shearing effect created by the stationary covering layer bonded to the adjacent instrument panel structure and the moving section of covering layer attached to the deployment door.

The shearing of the entire perimeter of the single door installation is particularly critical inasmuch as a single door design requires a greater extent of hinging movement of the deployment door in order to allow the air bag to pass through the deployment opening.

The present inventors have discovered that the adjacent structure of the trim piece, i.e., the instrument panel defining the opening into which the deployment door is fit, may distort appreciably during the air bag deployment and that this distortion will substantially affect the shear severing of the covering layer around the perimeter of the deployment door.

A substrate panel defining the deployment door and the adjacent instrument panel substrate are joined by the overlying covering layer which extends over both in the invisible seam design. An intermediate foam layer is typically included. The foam layer is bonded to both the covering layer and the deployment door substrate panel and the instrument panel substrate.

Thus, as the deployment door substrate panel attempts to hinge open, a force is exerted on the instrument panel structure tending to bulge the instrument panel structure outwardly.

This outward bulging creates several effects. Firstly, the bulging of the instrument panel itself to a significant degree delays the development of sufficient shear forces to sever the covering layer movement of the instrument panel with the deployment door relieves shear stress and movement.

Secondly, the instrument panel bulging, combined with the bulging of the deployment door from its center tends to convert the shear stress into a tensile stress of the covering layer. The covering layer, usually constructed of a plastic material such as vinyl, is able to elongate to a great extent under tension prior to failure particularly of elevated ambient temperatures.

Accordingly, a stretching tendency results in a substantial further delay in completing the severing of the covering layer.

There also results a mispositioning of the edge of the deployment door and the edge of the instrument panel defining the deployment opening. The vinyl covering layer is preferably preweakened by a grooving or cutting of the inside of the covering layer and the system is designed for the covering layer to sever along the grooving in a defined pattern matching the deployment door. The mispositioning described tends to shift the maximum stress exerted on the covering layer from the preweakening pattern.

Another problem associated with excessive deformation of the trim piece defining the deployment opening is that it may be permanently deformed thereby such as to require replacement in the event of an air bag system activation even though the collision triggering the activation did not produce enough vehicle damage to otherwise destroy the trim structure. Accordingly, the replacement of the air bag after activation will also require replacement of the entire instrument panel, substantially increasing the cost of repair.

Accordingly, it is the object of the present invention to provide a construction in which the air bag pressure on the deployment door or doors rapidly and reliably generates a shear stress on the covering layer sufficient to cause complete severing thereof and enable the deployment door to hinge open as quickly as possible to allow proper deployment of the air bag within the passenger compartment.

It is another object of the present invention to stabilize and reinforce the trim piece structure such as to avoid the destruction of the trim piece by activation of the air bag system.

SUMMARY OF THE INVENTION

These and other objects of the present invention which will be appreciated upon a reading of the following specification and claims are achieved by constructing the trim piece structure defining the deployment opening to be stabilized against the distorting effects of the forces exerted by the overlying cover layer such as to prevent substantial deflection of the opening perimeter particularly at the free sides of the deployment door such as to prevent the appreciable bulging thereof and the negative effects described above.

The stabilization of the trim piece perimeter defining the perimeter of the deployment opening is accomplished according to the described embodiment by providing a frame extending about the deployment opening and attached to or integral with the trim piece structure.

The frame is also preferably anchored to a rigid vehicle substructure such as the fire wall mounting the instrument panel preventing the trim piece structure adjacent the deployment opening from being appreciably deflected under the loads exerted by the air bag pressure such as to cause shearing stresses to be instantly developed and exerted on the covering layer by the pressure exerted by the deployment door attempting to open as the air bag inflates.

The covering skin layer is then very rapidly and reliably severed by the deployment door pressure to ensure proper deployment of the air bag.

The frame also prevents damage to the instrument panel which would require replacement, thus reducing repair costs after a system activation.

DETAILED DESCRIPTION

In the following detailed description, certain specific terminology will be employed for the sake of clarity and a particular embodiment described in accordance with the requirement of 35 USC 112, but it is to be understood that the same is not intended to be limiting and should not be so construed inasmuch as the invention is capable of taking many forms and variations within the scope of the appended claims.

Figure 4:
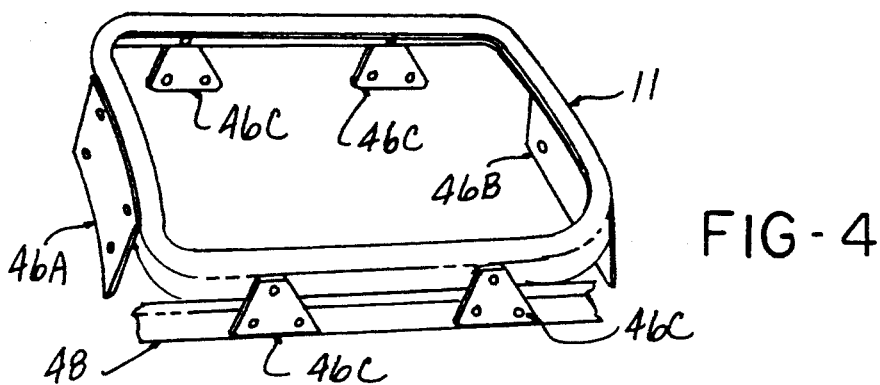
FIG. 4 is a perspective view of the deployment opening frame and anchoring tabs.
Figure 1:
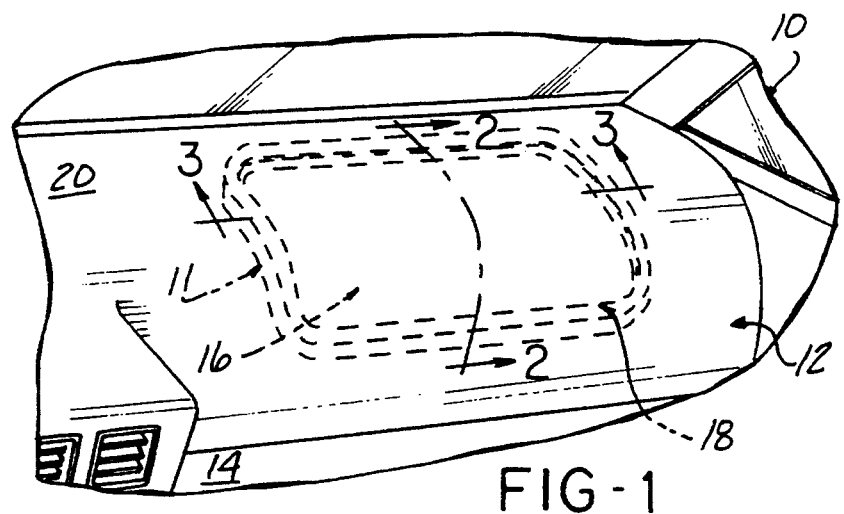
FIG. 1 is a fragmentary perspective view of the passenger side of a automotive vehicle having an invisible seam deployment door.

Referring to FIG. 1 an air bag installation depicted is the passenger side installation of an automotive vehicle. A portion of the body 10 is shown in FIG. 1.

The air bag installation is associated with an interior trim piece here comprised of the instrument panel 12 facing the passenger compartment 14 alongside the vehicle driver. The air bag when deployed through an opening, indicated generally at 16, serves to protect the passenger side occupants of the vehicle in the manner well known to those skilled in the art.

The air bag installation according to the present invention includes a deployment door substrate panel 18 located on or beneath the vinyl plastic covering layer 20 overlying the instrument panel 12 and extending over the deployment door substrate panel 18.

A surrounding frame 11 extends about the perimeter of the deployment opening 16. All of these components are hidden from view by virtue of the covering layer 20 smoothly and uninterruptedly overlying the instrument panel region whereat the air bag is installed.

Figure 2:
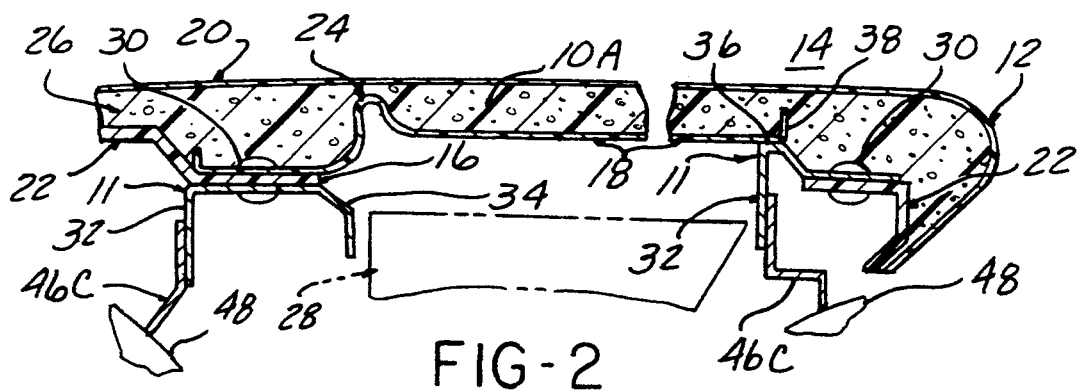
FIG. 2 is a fragmentary sectional view taken through the instrument panel and deployment door shown in FIG. 1. The section taken along the line 2—2 in FIG. 1.
Figure 3:
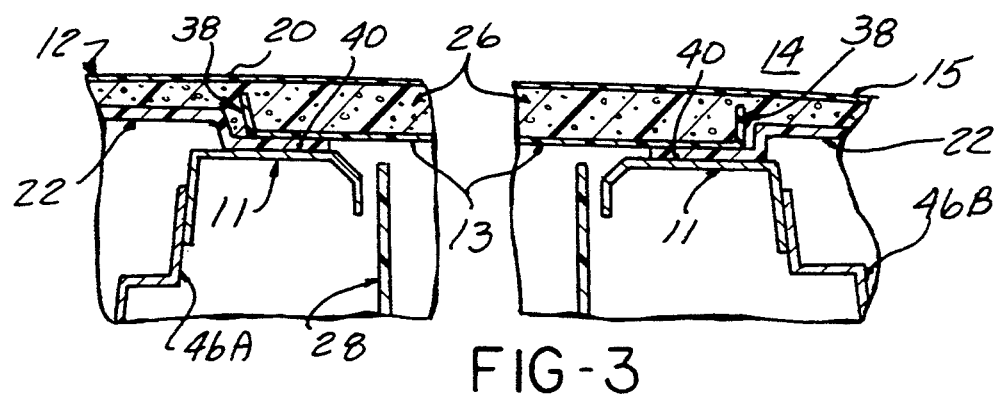
FIG. 3 is a transverse sectional and fragmentary view of the instrument panel and deployment door taken along the section line 3—3 in FIG. 1.

Referring to FIGS. 2 and 3, the deployment door substrate panel 18, typically of a suitable molded plastic material, for aluminum, is configured to be interfit within the deployment opening 16 formed in the instrument panel substrate 22. The deployment door substrate panel 18 is generally rectangular and hinged along one side by means of an integral curved hinging section 24 affixed to the forward side of the instrument panel substrate 22 adjacent the opening 16.

A foam layer 26 covers the instrument panel substrate 22 and the deployment door substrate panel 18 adhered thereto, the covering layer 20 also bonded to the foam layer 26. The foam layer 26 is commonly molded in place by a manufacturing technique well known to those skilled in the art.

An air bag canister 28 is mounted behind the instrument panel 12 at a location aligned with the deployment opening 16 in the instrument panel substrate 22.

The frame 11 is affixed to the instrument panel substrate 22 to the portions thereof which define the perimeter of the deployment opening 16. The frame 11 may be of sheet metal or molded plastic such as to stiffen and stabilize the substrate panel 22 in the regions extending around the perimeter of the deployment opening 16.

The frame 11 may be secured by rivets 30 as shown. Alternatively, an integral construction could be employed.

The frame 11 includes down turned sides and a connecting bottom section located against the perimeter opening the portions of the instrument panel substrate 22 extending about the perimeter of the deployment opening 16.

The downwardly extending flanges 32 and 34 provide a stiffening of the frame 11 against outward bending forces.

The frame 11 and the region adjacent the free side of the deployment door substrate panel 18 opposite the integral hinge 24 is formed with a bend defining a supporting stop 36 on which the free side of the deployment door substrate panel 18 rests such as to be able to resist inward pushing pressure.

An up turned rim of the deployment door 38 creates an edge increasing the pressure of the deployment door in cutting through the covering layer 20.

The covering layer 20 may also be partially scored from the inside as described in U. S. Pat. No. 5,082,310 referred to above.

The free sides of the deployment door panel 18 shown in FIG. 3 rest atop offset portions of the instrument panel substrate 40.

According to the concept of the present invention, the frame 11 is further stabilized by means of a series of anchoring flanges 46A–46C. Flange 46A is secured to the lefthand side of the frame 11, while flange 46B is attached to the righthand side and a series of smaller generally triangular anchoring tabs 46C attached along the front, and rear sides of the flange 11.

The anchoring tabs 46A–46C are attached to a rigid substructure of the vehicle 48 such as the fire wall to which the instrument panel is secured such as to provide a substantially rigid anchoring feature, preventing appreciable bulging of the instrument panel.

Accordingly, the movement of the deployment opening perimeter portions of the instrument panel substrate 22 is stabilized and restrained against outward pressures causing a tendency to outwardly bulge and deform along the three free sides of the deployment door. A shear stress is developed in the covering layer along the deployment door perimeter as rapidly as possible and severing of the covering layer occurs at the earliest possible moment in the deployment cycle. Inturn, this ensures that the air bag will deploy properly and rapidly enough to protect the vehicle occupant.

The stabilizing of the instrument panel substrate has the most effect if accomplished primarily along the three free sides of the deployment door substrate panel 18.

The air bag installation according to the present invention includes a process of forming the deployment opening 16 in the instrument panel substrate 22 wherein the opening is aligned with the stored air bag. The deployment door substrate panel 18 is fit into the opening and hinged along one side. The instrument panel substrate 22 is covered with the covering layer 20 and the frame 11 is fixed to the perimeter of the deployment opening 16 and the frame is anchored to the rigid substructure of the vehicle.

In double door situations, as shown in U.S. Pat. No. 5,082,310, the restraint and stabilization of the instrument panel substrate portions adjacent the sides of the door will produce this same effect.

The severing of the double door adjoining seam is accomplished by a somewhat different dynamic than the single door deployment door described above.

The restraint of the perimeter of the opening particularly on the free sides of the door should be as great as possible, i.e., the deformation of the perimeter defining portions of the instrument panel substrate is preferably minimal.

This can be accomplished by the step of anchoring the frame 11 to a fixed structure as by means of the anchoring tabs 46 described. Some deflection can be tolerated but a deflection of no more than 25 mm of the substrate adjacent the free side of the deployment door should be the design criteria.

The anchoring tabs could be dispensed with if a sufficient reinforcing of the instrument panel such as to prevent deflection of the perimeter portions in excess of this distance were thus achieved. However, the increased weight of the instrument panel likely necessary makes the use of anchoring tabs preferable.

We claim:

1. An air bag installation for the passenger compartment of a vehicle comprising:
   an interior trim piece mounted in said passenger compartment and having a substrate panel formed with an opening, said interior trim piece mounted to a fixed structure in said passenger compartment;
   an air bag storing canister mounted behind said trim piece substrate panel aligned with said opening therein, said air bag storing canister containing an air bag to be deployed by inflation thereof;
   at least one deployment door substrate panel fit into said opening and hinged along one side to a portion of said trim piece substrate panel adjacent said opening;
   a covering layer extending uninterruptedly over said trim piece substrate panel and said deployment door substrate panel to conceal said deployment door substrate panel from view, said deployment door substrate panel forced through said covering layer when said air bag is deployed;
   a perimeter stiffening frame extending around said opening and fixed relative said trim piece substrate panel;
   anchoring elements attached to said perimeter stiffening frame and to said fixed structure in said passenger compartment to thereby stabilize and restrain the perimeter of said opening from outward bulging upon forcing of said deployment door substrate panel to hinge open by inflation of said air bag and penetrating said covering layer.

2. The installation according to claim 1 wherein said covering layer is of vinyl plastic.

3. The installation according to claim 2 further including a foam layer interposed between said trim piece substrate panel and said deployment door substrate panel and said vinyl plastic covering layer.

4. The installation according to claim 1 wherein said deployment door substrate panel is generally rectangular having three free sides and a hinging side.

5. The installation according to claim 4 further including fixed stops on which said three sides of said deployment door substrate panel rests to prevent inward movement.

6. A method of forming an air bag deployment opening in a trim piece in a passenger compartment of a vehicle behind which an air bag is stored for inflation upon activation, said trim piece including a substrate panel, said method comprising the steps of:
   forming an opening in said trim piece substrate panel aligned with said stored air bag;
   fitting at least one deployment door substrate panel into said opening by hinging said at least one deployment door substrate panel along one side thereof so as to be able to open by swinging away when pushed by inflation of said air bag;
   covering said trim piece substrate panel with a covering layer extending uninterruptedly over said trim piece substrate panel and over said deployment door substrate panel;
   anchoring portions of said trim piece substrate panel defining the perimeter of said opening therein to a stiffening frame and anchoring said stiffening frame to fixed structure in said passenger compartment so as to limit deflection of said portions to 25 mm or less when said air bag is inflated and said deployment door substrate panel is forced to swing open and penetrate through said covering layer.

* * * * *

UNITED STATES PATENT AND TRADEMARK OFFICE
CERTIFICATE OF CORRECTION

PATENT NO. : 5,393,088
DATED : February 28, 1995
INVENTOR(S) : David J. Bauer et al It is certified that error appears in the above-identified patent and that said Letters Patent is hereby corrected as shown below:

Title page, Item [73] should be inserted to read as follows:

Tip Engineering Group, Inc.
Farmington Hills, Michigan

Signed and Sealed this

Sixteenth Day of May, 1995

Attest:

BRUCE LEHMAN

Attesting Officer

Commissioner of Patents and Trademarks